United States Patent Office 3,686,225
Patented Aug. 22, 1972

3,686,225
COMPLEXES OF POLYETHER COMPOUNDS
AND IONIC COMPOUNDS
Charles John Pedersen, Salem, N.J., assignor to E. I. du
Pont de Nemours and Company, Wilmington, Del.
No Drawing. Continuation-in-part of application Ser. No.
588,302, Oct. 21, 1966, which is a continuation-in-part
of application Ser. No. 358,937, Apr. 10, 1964. This
application Apr. 1, 1969, Ser. No. 812,452
Int. Cl. C07d 21/00
U.S. Cl. 260—340.3                                13 Claims

ABSTRACT OF THE DISCLOSURE

Complexes of ionic compounds and macrocyclic polyether "crown" compounds are prepared. The crown compounds are composed of from 1 to 4 vicinally dioxy cyclic hydrocarbons (e.g., benzene, naphthalene) or perhydro analogues thereof (e.g., cyclohexane, Decalin) joined through the vicinal oxygen atoms by diprimary alkylene groups or diprimary alkylene ether groups to form a macrocyclic ring having from 14 to 30 ring atoms, preferably 15 to 24, the oxygen atoms of the ring being separated one from the other by from 2 to 3 carbon atoms. Ionic compounds complexed are those having cations such as alkali metal ions, ions of alkali earth metals of atomic weight greater than 40, ammonium ions, $Cu^+$, $Ag^+$, $Au^+$, $Hg^+$, $Hg^{++}$, $Tl^+$, $Pb^+$, $La^{+++}$, and $Ce^{+++}$. The complexes make possible use of certain chemical reagents in hydrocarbon media wherein those reagents are normally insoluble.

CROSS-REFERENCES TO RELATED APPLICATIONS

This application is a continuation-in-part of application Ser. No. 588,302, filed Oct. 21, 1966; and now abandoned which is in turn a continuation-in-part of application Ser. No. 358,937, filed Apr. 10, 1964 and now abandoned.

BACKGROUND OF THE INVENTION

(1) Field of the invention

This invention relates to improved complexes of macrocyclic polyether compounds with ionic metal compounds.

(2) Description of the prior art

Heretofore, many chemical reagents useful in aqueous and alcoholic media have been unavailable for use in hydrocarbon media wherein they are normally insoluble. For example, although potassium hydroxide is a commonly employed reagent and benzene a widely used solvent, it has not been possible to dissolve the former in the latter even though finely divided potassium hydroxide is vigorously stirred into boiling benzene. Again, though potassium permanganate is widely used as an oxidizing agent, it has not been possible to employ the same to oxidize, e.g., olefinic compounds in hydrocarbon media because of its insolubility therein. Sodium nitrite, a corrosion inhibitor of iron and steel in aqueous systems, has not heretofore been susceptible to that employment in non-aqueous systems. Thus, a need has existed for a means of carrying normally insoluble reagent substances into solution in hydrocarbon media.

Cyclic polyether compounds having four or more oxygen atoms in the polyether ring have been prepared before. A review of the pertinent literature is set out in C. J. Pedersen, J. Am. Chem. Soc. 89, 7017 (1967). J. L. Down et al. report that the cyclic tetramer of propylene oxide, like several open chain polyethers, dissolves very small quantities of potassium and sodium to give unstable blue solutions, J. Chem. Soc. 3767 (1959). In none of the literature reviewed is mention made of formation of stable complexes with ionic metal compounds. One prior art compound similar at first sight to those employed in the instant complexes is reported (2,3,12,13-dibenzo-1,4,11,14-tetraoxaeicosa-2,12-diene), Makromol. Chem., 18–19, 511 (1956). That report makes no mention of complexation. Investigation reveals that the compound does not form complexes with ionic metal compounds.

BRIEF SUMMARY OF THE INVENTION

According to this invention, there are provided improved, stable complexes of macrocyclic polyether compounds and ionic metal compounds soluble in hydrocarbon media in which the uncomplexed metal compounds are normally insoluble. The complexing compound, in the broadest description, consists of a macrocyclic polyether ring in which oxygen atoms are separated one from the other by from 2 to 3 carbon atoms, the ring having fused thereto from 1 to 4 monocyclic or polycyclic aromatic or saturated hydrocarbon nuclei. The nuclei are attached by vincinal carbon atoms thereof to adjoining ring-oxygens in oxygen-carbon-carbon-oxygen arrangement.

The complexed compound is an ionic metal compound having a cation compatible with the particular complexing compound employed, e.g., an alkali metal ion, ions of alkali earth metals of atomic weight greater than 40, etc.

DETAILED DESCRIPTION OF THE INVENTION

Molecular models of representative complexing compounds employed in the invention have an annular configuration suggestive of a crown, and accordingly, those compounds are denoted "crown compounds." Complexes with ionic metal compounds are denoted "crown complexes." More specifically, the crown compounds are macrocyclic polyether compounds composed of (a) from 1 to 4 vicinally dioxy cyclic hydrocarbons independently selected from the group consisting of monocyclic and polycyclic aromatic hydrocarbons of the benzo series consisting of from 1 to 3 fused rings (e.g., benzene, naphthalene, anthracene, phenanthrene), and the perhydro analogues thereof (e.g., cyclohexane, Decalin, perhydroanthracene, perhydrophenanthrene); joined to form a macrocyclic polyether ring of from 14 to 30 ring atoms by (b) ring-closing groups independently selected from the group consisting of diprimary alkylene groups and diprimary alkylene ether groups; ring closure being through the vicinal oxygen atoms of the vicinally dioxy cyclic hydrocarbons. The oxygen atoms of the polyether ring are separated from the adjoining oxygen atoms of the ring by from 2 to 3 carbon atoms to ensure reliable complexing. It has been discovered that where more than a 3-carbon separation obtains, complexing will in most cases be impossible.

The structures of representative crown compounds are set out below. The numerals centered in the polyether ring refer to the number of ring atoms contained therein. The segments

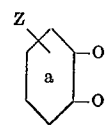

identify the "vicinally dioxy cyclic hydrocarbons" referred to above, where the substituent Z is hydrogen, alkyl, aryl or the like as discussed hereinafter.

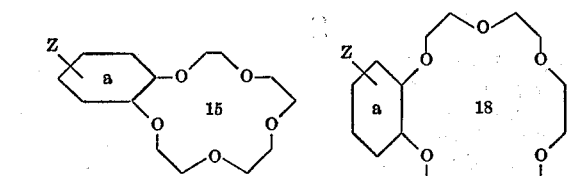
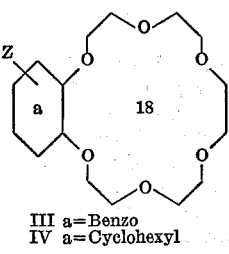

I a=Benzo
II a=Cyclohexyl

III a=Benzo
IV a=Cyclohexyl

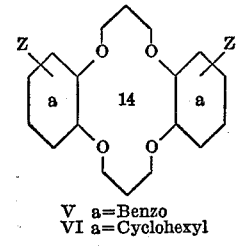
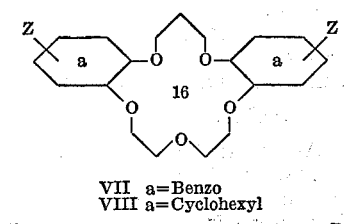

V a=Benzo
VI a=Cyclohexyl

VII a=Benzo
VIII a=Cyclohexyl

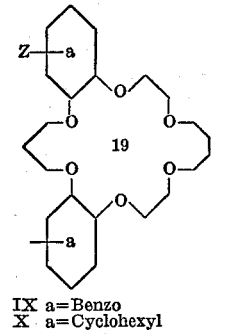
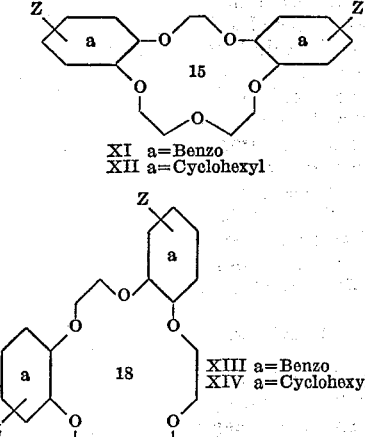

IX a=Benzo
X a=Cyclohexyl

XI a=Benzo
XII a=Cyclohexyl

XIII a=Benzo
XIV a=Cyclohexyl

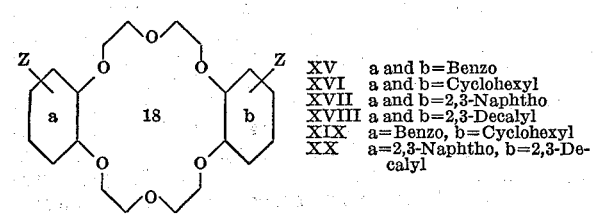

XV   a and b=Benzo
XVI  a and b=Cyclohexyl
XVII a and b=2,3-Naphtho
XVIII a and b=2,3-Decalyl
XIX  a=Benzo, b=Cyclohexyl
XX   a=2,3-Naphtho, b=2,3-Decalyl

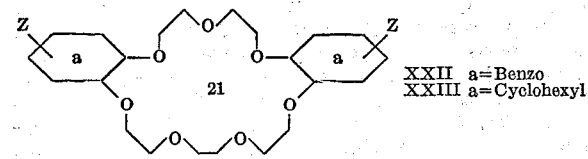

XXII a=Benzo
XXIII a=Cyclohexyl

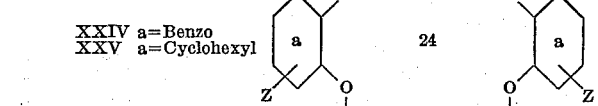

XXIV a=Benzo
XXV a=Cyclohexyl

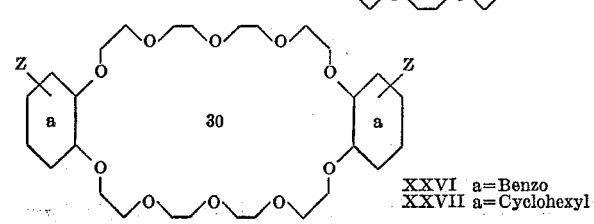

XXVI a=Benzo
XXVII a=Cyclohexyl

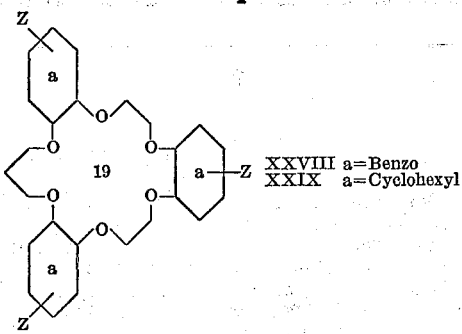

XXVIII a=Benzo
XXIX a=Cyclohexyl

XXX a=Benzo
XXXI a=Cyclohexyl

XXXII a=Benzo
XXXIII a=Cyclohexyl

XXXIV a=Benzo
XXXV a=Cyclohexyl

Especially preferred of the above are XV (Z=H) and XVI (Z=H). In addition to the usual case where Z is hydrogen, other substituents can be appended to the fused nuclei where desired. Thus, Z can be halo, nitro, amino, azo, $C_1$–$C_4$ alkyl, $C_1$–$C_4$ alkenyl, $C_6$–$C_{12}$ aryl, $C_7$–$C_{16}$ aralkyl, $C_1$–$C_4$ alkoxy, cyano, hydroxy, carboxy, sulfo, and the like.

Provided the substituent group is inert to the reactants employed in forming the novel polyether compounds of the present invention, the group can be present in the vicinal dihydroxyaromatic compounds which are preferred starting materials for the formation of the cyclic polyether compounds. In other instances the substituent may be introduced after formation of the macrocyclic polyether ring by conventional chemical reaction e.g. by azo coupling of an amino compound to introduce the azo grouping. In yet other instances the substituents may be formed by chemical reaction of other substituents, e.g. nitro groups can be reduced to amino groups.

Crown compounds having as many as 60 ring-atoms can be prepared and complexed with the larger cations such as Ba$^{++}$. However, as the compounds increase in ring-size, their capacity to complex the smaller cations falls off, and as a practical upper limit for commercial complexation, compounds having 30 ring atoms can be chosen. In general, crown compounds having fewer than 14 ring atoms are unsatisfactory candidates for complexation.

A preferred class of compounds can be represented by the general formula:

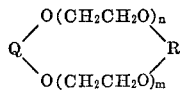

where Q and R are vicinally divalent cyclic hydrocarbons independently selected from the group consisting of monocyclic and polycyclic hydrocarbons of the benzo series consisting of from 1 to 3 fused rings, and the perhydro analogues thereof; and R can additionally be

—CH$_2$CH$_2$—

To ensure reliable complexing, $n$ should be from 1 to 7, $m$ from 1 to 7, and $n+m$ from 3 to 8, preferably 3 to 4.

The above class of compounds can be made with particular ease, as will become apparent from a description of the mode of synthesis described hereinafter.

In addition, another class of preferred compounds which can be readily made is:

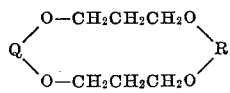

This class of compounds has been found particularly valuable for the manufacture of complexes of lithium salts.

The general procedures for the synthesis of compounds containing at least one aromatic fused nucleus involve the following reactants:

(a) a vicinally dihydroxy aromatic compound such as catechol;

(b) an α,ω-alkylene diprimary dihalide compound or an α,ω-alkylene ether diprimary dihalide compound in which the halogen and oxygen atoms are separated by chains of 2 to 3 carbon atoms, wherein the halogen of the alkylene or alkylene ether compound is preferably chlorine, but may also be bromine or iodine; and (c) at least one equivalent of a strong base, preferably sodium hydroxide, for each phenolic hydroxyl group.

In general, equimolar quantities of (a) and (b) are consumed. The detailed procedure is selected to favor the particular type or crown compound desired and varies depending upon the nature of the dihydric phenol and the dihalide. The alkylene or alkylene ether compound is preferably unbranched and non-substituted. Where desired, however, it can have C$_1$–C$_4$ alkyl side chains. In such case, the side chains are preferably C$_1$–C$_2$ alkyl to ensure the absence of steric hindrance in complex formation.

When more than one crown compound is present in the reaction product conventional separation techniques such as selective solvent extraction, fractional distillation and fractional crystallization can be employed to obtain the compounds desired.

A typical reaction in which one molecule of dihydric phenol and one molecule of dihalide, as described above, are incorporated into the product is as follows:

(A)
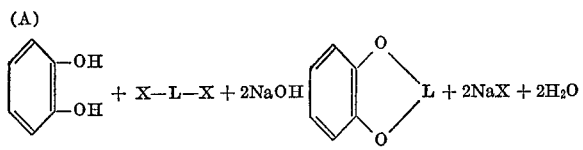

wherein X—L—X is an ether compound, reactant (b), having at least 2 oxygen atoms and wherein X is halogen. For example, in making the preferred compounds:

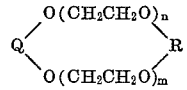

where R=Q, the compound X—L—X is

X(CH$_2$CH$_2$O)$_p$CH$_2$CH$_2$X wherein $p$ is chosen such that $n+m$ is from 3 to 8.

In some instances, a significant proportion of polyaromatic crown compound can be formed, e.g. by incorporation of 2 molecules of dihydric phenol and 2 molecules of dihalide. Typical reactions are as follows:

(B)
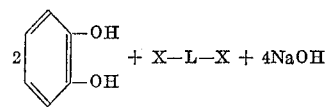

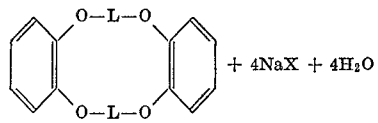

wherein X—L—X is either the alkylene or alkylene ether reactant (b), or both. Some monoaromatic product may also be produced. To avoid production of monoaromatic product it is usually preferable (particularly when mixed L groups are desired) to make the polyaromatic crown compound by a sequence of reactions characterized by the use of partially blocked dihydric phenols during the formation of the least one of the ring ether groups by reaction of the residual (unblock) phenolic hydroxyl groups with a reactant (b). Later the blocked hydroxyl groups are regenerated for further condensation reactions with the same or different reactant (b). The blocked groups must be stable toward base under the conditions of the reaction with X—L—X. Regeneration of the phenolic hydroxyl group afterward should not adversely affect the ether groups present. The phenolic hydroxyl group can be conveniently blocked by reaction with dihydropyran, typically:

(C)
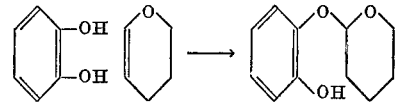

or alpha-chloromethyl ether (D)
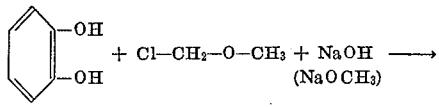

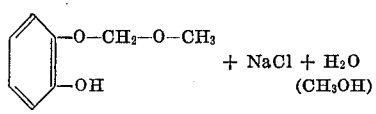

The blocked phenol is then reacted with the halide (E)
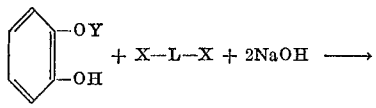

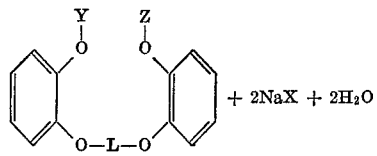

where Y is the blocking unit, e.g.

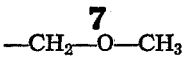

Treatment with acid gives a dihydric compound (F) 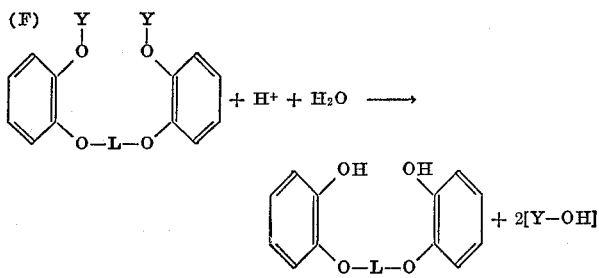

The dihydric compound may be isolated and purified, if desired. It can be partially blocked or it can be reacted directly with reactant (b). For example, the dihydric compound can be treated with a mole of X—L—X, wherein L is the same or a different divalent group to give the diaromatic crown.

(G) 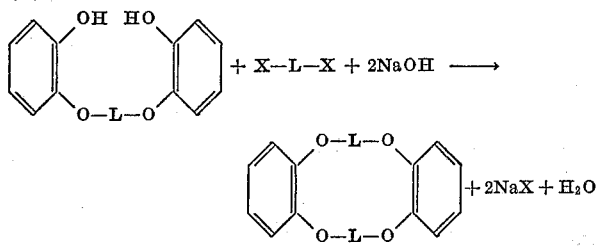

By employing a reactant (b) containing an aromatic nucleus, the number of such nuclei appearing in the polyether product can be increased to three or more. Other methods for determining the placement and quantity of aromatic nuclei in the final product will be obvious to the skilled chemist by reference to the foregoing reactions.

It is apparent that the particular dihalide or ether compound chosen for reactant (b) will determine, in part, the quantity and composition of the ring atoms of the final product, with the hydroxyl oxygens and vicinal carbon atoms of the aromatic nucleus making up the remainder of the ring. The preparation of the complexing compounds are not limited to the foregoing typical procedures since other methods are obviously applicable to obtain the macrocyclic polyethers hereinbefore defined.

Generally, the crown compounds are made in a solvent. In order to get good results, it is desirable that the solvent dissolve the basic reagent as well as the dihydric phenol and the dihalide. Representative solvent systems include mixtures of water and butyl alcohol; lower alkyl ether derivatives of ethylene glycol; dioxane; alcohols; mixtures of ether and alcohol. The amount of solvent needed can be selected on the basis of operating convenience for a particular set of reactants.

The base for carrying out the substitution reaction is a group IA metal hydroxide, with sodium hydroxide being preferred. In place of the inorganic bases one can use quaternary ammonium hydroxide such as tetramethyl ammonium hydroxide or tetraethyl ammonium hydroxide.

The reaction can be carried out over a wide range of temperatures. For operating convenience, temperatures from about 90° C. to about 140° C. are preferred. The reaction time will vary depending upon the temperature and other factors. Other conditions being equal, the higher the temperature the shorter the time. Typically, time has ranged from about 6 hours to about 24 hours. The most suitable time and temperature for a particular set of reactants can be determined by routine experimentation.

The crown product can be isolated by conventional methods such as by concentration of the reaction mixture or by mechanical collection of insoluble (or precipitated) product. The crown compounds are freed from impurities, such as open-chain polyethers, by recrystallization from organic liquids such as alcohol, chloroform, 2-ethanol, benzene and heptane.

Cyclic polyether crown compounds having a macrocyclic polyether ring fused to hydrogenated aromatic rings can be made by catalytic hydrogenation of the corresponding aromatic compounds by techniques familiar to those skilled in the art. Suitable hydrogenation catalysts are ruthenium dioxide, ruthenium dioxide on charcoal, ruthenium dioxide on alumina, platinum oxide and platinum on charcoal. The solvent can be any suitable hydrogenation solvent which will dissolve the crown compounds. Dioxane is suitable as a solvent. The aromatic crown complexes of non-reducible salts such as the alkali metal halides can be hydrogenated in alcohols such as methanol and n-butanol.

The temperature of hydrogenation is suitably from 60 to 120° C. Pressures can range from 500 to 2000 p.s.i.g. Typical times required are from 3 to 20 hours. It will be realized, however that these values are not critical.

Some cleavage of the macrocyclic polyether ring occurs, leading to the formation of dihydric alcohol by-products in addition to the desired hydrogenation product. These products can be separated and the desired hydrogention product can be isolated by conventional physical methods, such as fractional crystallization and the like from solvents such as alcohol, chloroform, 2-ethoxyethanol benzene and heptane, or by chromatographic separation. If the desired product does not otherwise contain active hydrogen groups, the reaction product can be reacted with reagents such as organic isocyanates, which react readily with hydroxy compounds, to facilitate separation of the products.

In general, complexes formed with saturated crown compounds are more soluble and stable than are those formed with aromatic crown compounds. On the other hand, the presence in the crown compound of aromatic nuclei carries with it certain advantages. For example, complex formation with aromatic crowns can be followed by commercial ultraviolet spectrophotometers. The fully saturated crown compounds do not absorb within the limits of such instruments. By partially saturating the crown compounds, so as to obtain compounds having both aromatic and saturated nuclei fused thereto, comprise compounds having the advantages of each type can be prepared.

The crown compounds described hereinabove form novel complexes with many ionic metal compounds. Salt-polyether complexes according to the invention appear to be formed by ion-dipole interaction between the cation of the metal compound and the negatively-charged oxygen atoms placed about the polyether ring, the associated anion remaining in the vicinity of the complex. Accordingly, the cation of the metal compound plays a major part in complexation, while its anion plays a relatively minor role.

In light of the above, the art-skilled can readily determine the salt compound best-suited for complexation of a particular cation. Of course, where the intended employment of the complex depends upon the particular anion, as where complexed permanganate is to be employed as an oxidant, the salt chosen will reflect the desired complex.

Complexes according to the invention have been formed with salts such as thiocyanates, halides, trihalides, adipates, nitrates, nitrites, hydroxides, hydrosulfides, t-butoxides, acetates, phenyl salts, pivalates, permanganates, abietates, hexafluorophosphines, octanoates, heptylsulfonates, dicyanoaureates, hexacyanoferrites, cobalt (II) tetrachlorides, platinous tetrachlorides, palladous (II) tetrachlorides, etc.

Of course, particular anions do affect the solubilization of polyethers and salts, and the formation of crystalline complexes. However, so long as a particular anion is soluble in the solvent employed and does not absorb at 275 mμ, complex formation at low polyether concentration and high excess of salt occurs and can be followed by ultraviolet spectroscopy without regard to the particular anion employed. Where, by reason of the particular anion's employment a complex cannot easily be crystallized from solution, the complex can be used in solution form.

Crystalline complexes are obtained where (1) the crystal lattice energy of the polyether is sufficiently low; (2) the complexing power of the polyether is strong enough; (3) the crystal lattice energy of the salt is sufficiently low; and (4) the solubility of the complexable salt in the polyether or a mutual solvent is appreciable. In most cases, crystalline complexes are not obtained with salts of high crystal lattice energy, such as the carbonates, sulfates, nitrates, phosphates, and fluorides.

Among the cations complexable with the crown compounds are alkali metal ions, ions of alkali earth metals of atomic weight greater than 40 (magnesium and beryllium appear too covalent for ready complexation), ammonium ions, cations containing $-NH_3^+$, $Cu^+$, $Ag^+$, $Au^+$, $Hq^+$, $Hg^{++}$, $Tl^+$, $Pb^{++}$, and $Ce^{+++}$.

Factors influencing formation and stability of a particular complex include (1) the relative sizes of the cation and the hole in the polyether ring, (2) the number of oxygen atoms in the polyether ring, (3) the coplanarity of the oxygen atoms, (4) the symmetrical placement of the oxygen atoms, (5) the basicity of the oxygen atoms, (6) steric hindrance in the polyether ring, and (7) the tendency of the ion to associate with the solvent. With respect to a particular crown compound, a "compatible cation" as used herein refers to one which forms a complex, having due regard to the above-listed factors.

In most cases, a major consideration is the factor numbered (1). In many cases, a stable complex is not formed where the ion is too large to lie in the hole of the ring. However, complexation can occur in spite of some deviation from a good cation-ring hole "fit," through the formation of a "sandwich" structure, e.g. (crown)-(cation)-(crown) or (crown) - (cation) - (crown) - (cation)-(crown). For example, 2:1 rubidinum, 2:1 cesium, and 3:2 cesium complexes have been prepared. In most cases, however, complexation occurs in a 1:1 ratio. Exemplary anion and hole diameters are given below.

TABLE I

| Ionic diameters, A. | Diameters of holes, A. | | |
|---|---|---|---|
| | Ring-atoms | Ring-oxygens | Diameters |
| Li, 1.20; Ag(I), 2.52 | 12 | 4 | 1.2–1.5 |
| Na, 1.90; Au(I), 2.88 | 15 | 5 | 1.7–2.2 |
| K, 2.66; Ca, 1.98 | 18 | 6 | 2.6–3.2 |
| NH₄, 2.84; Sr, 2.26 | 21 | 7 | 3.4–4.3 |
| Rb, 2.96; Ba, 2.70 | 24 | 8 | >4 |
| Cs, 3.34; Ra, 2.80 | | | |

A complex is the more stable the greater the number of oxygen atoms, provided the oxygens are coplanar and symmetrically distributed in the polyether ring. An oxygen atom is considered to be coplanar if it lies in the same plane as all the other oxygens in the rings, and the apex of the C—O—C angle is centrally directed in the same plane. Symmetry is at a maximum when all the oxygen atoms are evenly spaced in a circle. When seven or more oxygens are present in the polyether ring, they cannot arrange themselves in a coplanar configuration, but they can arrange themselves round the surface of a right circular cylinder with the apices of the C—O—C angles pointed toward the center of the cylinder. This configuration, termed cylindrically symmetrical, permits the formation of salt complexes.

The stability of the complex is the higher the more basic the oxygen atoms, one attached to an aromatic carbon being less basic than one attached only to aliphatic carbon atoms.

Steric hindrance in the polyether ring prevents the formation of complexes.

Complexes are formed according to this equation $$(\text{metal}^{m+})\text{-n-solvent} + \text{polyether} \rightleftharpoons \text{polyether-(metal}^{m+}) + \text{n-solvent}$$

Hence, the formation of the complex of a particular ion will be minimized or prevented if the ion is too strongly associated with the solvent. In a given group of elements, the solvation energy is usually an inverse function of the ionic diameter.

The complexes are prepared by one or more of the following methods:

Method 1.—Varying amounts of polyether and metal compound are dissolved in a suitable mutual solvent which is later removed by evaporation from the resulting complex, usually under vacuum.

Method 2.—Varying amounts of polyether and metal compound are dissolved in a minimum quantity of a hot mutual solvent, the resulting complex being precipitated by cooling and mechanical separation, e.g. by filtration, centrifugation, etc.

Method 3.—Varying amount of polyether and metal compound are heated in a solvent in which only the latter is readily soluble, the polyether being converted into a crystalline complex without the system ever becoming a clear solution. The complex is recovered by filtration.

Method 4.—Varying amounts of polyether are warmed with thorough mixing with the metal compound. No solvent is used.

Method 5.—A benzene solution of cyclic ether-potassium hydroxide complex of known concentration is reacted with a protonated anion, e.g.

(cyclic ether-KOH) + NH₃ ⟶ (cyclic ether-KNH₂) + H₂O

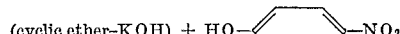

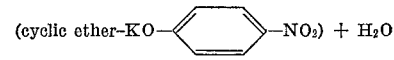

The water formed in the reaction can either be left in the solution or removed, if possible, with a chemically inert drying agent or by azeotropic distillation. The solid complex, if desired, can be obtained by removing the benzene under vacuum. An example of a suitable cyclic ether is XVI (Z=H).

As a general rule, the greater the stability of the crown complex in a particular environment, i.e., solvent, the greater is the chance of isolating the complex in pure form. The stability constant of the crown complexes depends on the solvent in which they are contained. The crown complexes of V (Z=H) are decomposed in water; thus the solubility of this compound in water is essentially unchanged by the presence of lithium bromide or sodium bromide. On the other hand, its solubility in methyl alcohol is increased almost 10-fold when lithium bromide is introduced. The complex formed by V (Z=H) and the lithium ion in methyl alcohol can serve as a means for tying-up the ion therein for removal from the alcohol and subsequent release in water.

The increase in solubility due to complex formation is even more dramatically illustrated in normal butyl alcohol where the introduction of lithium bromide causes a 33-fold increase in the solubility of V (Z=H). In similar fashion, the solubility of XV (Z=H), which has an 18-atom structure in which the oxygen atoms are very symmetrically arranged, is increased 5.5-fold at 26° C. in the presence of sodium chloride, 8.9-fold in the presence of strontium chloride, but depressed to 56% in the presence of magnesium chloride with which it does not complex.

The order of stability of the complexes formed between the crown compounds and ionic alkali metal compounds can be determined conveniently and rapidly by extraction experiments. By way of illustration, the extraction of alkali metal compounds from aqueous solution into methylene dichloride by the crown compound XVI (Z=H) will be described.

A solution of the crown compound and picric acid in methylene dichloride is made containing 0.05 mole per liter of XVI and 0.05 mole of picric acid. This solution is shaken with an equal volume of an aqueous solution containing a known volume of the selected metal salt at a concentration of 0.5 or 1.0 molar. The organic phase containing crown complexed picrate is then separated and the metal ions recovered from this organic phase by shaking with concentrated aqueous HCl. The results are expressed as percentage of the maximum theoretical amount extractable (0.05 mole per cycle in this instance). Experiment shows that in the absence of the crown compound the picrates are not extracted from aqueous solution by the methylene dichloride.

TABLE II

Extraction of alkali metal ions as crown complex in methylene dichloride

| Salt | Conc., M | Percent complex formed | Salt | Conc., M | Percent complex formed |
|---|---|---|---|---|---|
| LiCl | 1.0 | 27 | KOAc | 1.0 | 95 |
| Na$_2$CO$_3$ | 0.5 | 30 | KCl | 1.0 | 95 |
| NaCl | 1.0 | 34 | Cs$_2$CO$_3$ | 0.5 | 75 |
| KOH | 1.0 | 95 | CsF | 1.0 | 69 |
| K$_2$CO$_3$ | 0.5 | 95 | | | |

Similar results can be obtained spectroscopically analyzing at 376 millimicrons the clear methylene chloride solution of the crown compound/metal picrate solution. For convenience, concentrations of crown compound and picric acid of 7×10$^{-5}$ M are employed to obtain extinction coefficients in a range convenient for measurement, i.e., below an optical density of 1.5. Using this procedure and XVI above as the crown compound, the extraction efficiency of 0.1 M metal hydroxide solution is found to be 2.4% for Li$^+$ 18.6%; 24.9% for Na$^+$; 83.7%, 73.0% and 77.8% for K$^+$; 65.4% for Rb$^+$; 36.7%, 43.5% for Cs+; 56.8%, 51.2% and 52.8% for Ba$^{++}$ and 95.4% for Pb.

Similar extraction procedures can be employed to determine the relative complexing power of other crown compounds of this invention with the above-named and other cations. The formation of these crown complexes with metal salts can also be detected and determined by ultraviolet spectroscopy.

The formation of crowned complexes makes it possible to use certain chemical reagents in hydrocarbon media wherein they are normally insoluble. For example, a benzene-soluble complex of potassium hydroxide is prepared by reacting equimolar amounts of potassium hydroxide and XVZ=t-butyl) in methanol and completely removing the solvent by evaporation. In a typical experiment, the benzene solution made by stirring this solid complex in benzene at 25° C. and on filtering is found to be 0.02 normal in basicity. On the other hand, if finely divided potassium hydroxide is vigorously stirred in boiling benzene and the resulting mixture filtered to exclude dispersed solid potassium hydroxide, the benzene filtrate contains essentially no potassium hydroxide.

The hydrogenated compound XVI (Z=H) can be used in the same manner to make a toluene solution of potassium by dioxide approximately 0.3 N in basicity.

Neither sodium nitrite nor potassium permanganate is soluble in benzene. The former can be made soluble in benzene in exactly the same way as potassium hydroxide. Potassium permanganate is rendered soluble in benzene by reacting equimolar quantities of potassium permanganate and 2,3,11,12-bis(t - butyl benzo) - 1,4,7,10,13,16-hexaoxacylooctadeca-2,11-diene in acetone and completely removing the solvent from the crowned complex by evaporation.

In general, these benzene-soluble crowned complexes are new analytical reagents for use in hydrocarbon media wherein the uncrowned reagents are normally insoluble. Furthermore, these complexes can be used for industrial processes. The benzene-soluble potassium hydroxide complex can be employed to initiate the anionic polymerization of acrylonitrile or pivalolactone, a hydroxyl-terminated polymer product resulting. It can also be used as a soluble acid-acceptor in nonprotic systems. The benzene-soluble sodium nitrite complex can be used as a corrosion inhibitor of iron and steel in non-aqueous systems, and to effect the diazotization and nitrozation of amino compounds in non-hydroxylic media.

Potassium 2-ethylhexanoate is essentially insoluble in cyclohexane, and the electrical resistance of cyclohexane in contact with this salt is not much less than that of the solvent by itself. The tertiary-butyl crowned potassium 2-ethylhexanoate is soluble in cyclohexane and reduces the electrical resistance, that is, increases the electrical conductivity; hence, these solubilized crown salts can be used to increase the electrical conductivity of nonprotic systems. By complexation according to the invention, the electrical conductivity of fused salt systems (e.g., KCNS) can also be substantially increased.

The crown compounds are useful for the separation of dissolved salts. The salt which can form a crown complex can thereafter be extracted by an immiscible solvent which cannot dissolve the uncomplexed salts present. By way of illustration, water soluble salts that form crowned complexes can be separated from salts that do not; a water-insoluble solvent for the complex is employed for the extraction. For example, XVI (Z=H) complexes with potassium ion, but not with magnesium ion; hence, potassium salts can be separated from magnesium salts by this method.

Hydrocarbon soluble complexes of the cyclic polyethers with potassium hydroxide or potassium salts of weakly acidic compounds (e.g., 2-ethyl-hexanoic acid and m-nitrophenol) are strong catalysts for the polymerization of formaldehyde and the trimerization of isocyanates.

It is known that aliphatic and aromatic isocyanates form trimers (trisubstituted isocyanurates) when treated with various basic catalysts. Diisocyanates and polyisocyanates may react further to give highly polymerized resins presumably containing isocyanurate rings joined in a branched structure. Any of the complexes which may be derived from selected basic alkali metal salts and certain of the cyclic polyethers of this invention are highly active catalysts for converting organic isocyanates to trimers. The prepararation of these complexes has been described hereinbefore. The preferred complexes are those obtained from saturated cyclic polyethers and basic potassium salts such as the hydroxide, acetate, 2-ethyl hexanoate and cyanide. Especially preferred are complexes of XVI (Z=H) and potassium salts of phenols. The basic salt complexes are useful for effecting the trimerization of organic isocyanates in general; including aliphatic, cycloaliphatic, aromatic and arylalkyl types having one or more isocyanate groups per molecule. The catalysts may also be used to cross-link low molecular weight polymers having —NCO groups. Trimerization with these catalysts can be conducted in the presence of dry, inert solvents such as benzene and acetone or in the absence of solvents. With aromatic isocyanates trimerization can be initiated at room temperature by adding about 0.01–0.1 part of complex per 100 parts of isocyanate. Due to the exothermic nature of the reaction, the temperature rises if cooling is not provided. In the case of aliphatic isocyanates, which trimerize sluggishly relative to aromatic isocyanates, it may be desirable to heat the reaction mass to provide a reasonable rate of reaction.

A preferred procedure for preparing trimers from 2,4- or 2,6-tolylene diisocyanate or mixtures thereof involves adding about 0.03 part of the complex of 2,5,8,15,18,21-hexaoxatricyclo [20.4.0.0$^{9.14}$] hexacosane and the potassium salt of 2,4,6-tri-tert-butyl phenol to 100 parts of diisocyanate at about 25 to 50° C. The complex is conveniently handled in the form of a concentrated solution in benzene. Following catalyst addition, the reaction mass is allowed to heat up of its own accord. On reaching a temperature of about 120–155° C., the reaction stops automatically with commercial grades of diisocyanate apparently due to deactivation of the catalyst. When run on a large scale, about 0.03 phr. of benzoyl chloride should be added to the diisocyanate prior to catalyst addition to insure cut-off of the reaction at 120–155° C. At this point, about 40–60% of the tolylene diisocyanate has been converted to trimer and very little polymeric material has been formed. The solution of trimer in diisocyanate may be used as such, diluted with additional diisocyanate, or isolated by removing unreacted diisocyanate by vacuum distillation.

Benzene-soluble complexes of cyclic polyether with potassium hydroxide causes a solution of 5-amino-2,3-dihydro-1,4-phthalazinedione (Luminol) in dimethylformamide or dimethyl sulfoxide to chemiluminesce brilliantly in air. It also ionizes metal-free phthalocyanine to give a benzene solution of phthalocyanine anions which regenerate the phthalocyanine by protonation.

Because of their ability to solubilize cations in low dielectric media, the crown compounds can act as molecular carriers in transporting life-supporting cations like sodium and potassium across mitochondrial membranes.

Complexes with basic divalent metal hydroxides such as $Ca(OH)_2$, $Ba(OH)_2$ and $Sr(OH)_2$ can be employed in curing systems for the vulcanization of elastomers.

One employment of the complexes to which particular attention has been paid involves use of complexed potassium permanganate as oxidizing agents in non-protic media such as benzene, toluene, and p-xylene. High yields are attained without need of more than the equivalent amount of oxidant. Employing XVI ($Z=H$) at 25° C., olefins, alcohols, and aromatics can be oxidized to ketones or carboxylic acids, depending on substitution. Typical compounds which can be oxidized are alkyl-, aromatic-, or strained ring-substituted olefins (e.g., stilbene, cyclohexene, α-pinene); alkyl- or aromatic-substituted primary or secondary alcohols (e.g., 1-heptanol, benzyl alcohol, benzhydrol); and alkyl-substituted benzenes (e.g., toluene, xylene). The oxidation process additionally appears generally applicable to other functional moieties such as aldehydes, amines, sulfides, and other hetero compounds.

The following examples are illustrative of the complexes of the invention. Parts and percents are by weight unless otherwise noted. Examples of the preparation of the crown compounds themselves are contained in U.S. patent application Ser. No. 588,302, filed Oct. 21, 1966 and are expressly incorporated herein by reference.

EXAMPLE 1

Preparation of complexes of 2,5,8,15,18,21-hexaoxatricyclo[20.4.0.0$^{9,14}$]hexacosane, (XVI, X=H)

(A) With potassium hydroxide.—A one liter round-bottom flask is charged, while agitated, with 250 ml. of anhydrous methanol, 10 g. (0.15 gram-mole) of 85% potassium hydroxide, and 49.6 g. (0.133 gram-mole) of 2,5,8,15,18,21-hexaoxatricyclo[20.4.0.0$^{9,14}$]hexacosane. Heat is evolved. After everything appears to be in solution, the flask is attached to a rotary evaporator and volatiles are removed at 40° C. (0.5 mm. Hg.). The residue, 63.0 gm., is taken up in 650 ml. of benzene and filtered through fine paper. The filtrate is a clear pale yellow solution which is 0.156 normal in alkalinity (equivalent to 8.74 g. KOH per l. or 1% KOH by weight). The yield of the complex based on the starting polyether is 75%.

(B) With potassium iodide.—A 2.0-gram portion (0.0121 gram-mole) of potassium iodide is added to an agitated solution of 4.5 grams (0.0121 gram-mole) of the crown compound of Part A in 100 milliliters of methanol at 25° C. Concentration of the clear, faintly yellow solution, which results, gives 6.7 grams of residue. This material is taken up in 150 milliliters of benzene and filtered through fine paper. Concentration of the filtrate in a vacuum rotary evaporator gives 6.1 grams of white solid. Recrystallization of this material from warm benzene gives 5.5 grams of white, free-flowing powder.

Analysis.—Calculated (percent): carbon, 44.6; hydrogen, 6.7; iodine, 23.6. Found (percent): carbon, 45.4, 44.5; hydrogen, 6.6, 6.8; iodine, 23.0. The solubility in benzene is equivalent to 1.35 percent by weight of potassium iodine at 26° C.

(C) With potassium triiodide.—A potassium triiodide complex is prepared by mixing 150 ml. of methanol, 0.212 g. (0.00085 gram-mole) of iodine, and 0.458 g. (0.00085 gram-mole) of the potassium iodide crowned complex prepared in Part B above, and subsequently removing the solvent under vacuum in a rotary evaporator. The complex is a dark brown solid very soluble in methylene chloride, chloroform and ethylene chloride; soluble in o-dichlorobenzene and tetrahydrofuran; and poorly soluble in carbon tetrachloride.

Analysis.—Calculated for $C_{20}H_{36}O_6I_3K$ (percent): carbon, 30.3; hydrogen, 4.6; iodine, 48.1. Found (percent): carbon, 29.9; hydrogen, 4.5, 4.6; iodine, 47.9.

(D) With ammonium thiocyanate.—A 3.72 gram (0.01 gram-mole) portion of the crown compound of Part A and 0.76 gram (0.01 gram-mole) of ammonium thiocyanate are mixed at 26° C. in 8 milliliters of methanol. After the temperature has risen to 31° C. and the solids have dissolved completely, 17 milliliters and 0.1 gram of Darco black are added and the mixture filtered. Concentration of the filtrate under vacuum in a rotary evaporator leaves a very viscous resin weighing 4.4 grams (theoretical yield: 4.48 grams).

Analysis.—Calculated (percent): carbon, 56.3; hydrogen, 8.9; nitrogen, 6.3; sulfur, 7.1. Found (percent): carbon, 55.1; hydrogen, 8.9; nitrogen, 6.14; sulfur, 7.1. After the viscous resin has crystallized, the melting point of the complex is obtained (107–110° C.).

EXAMPLE 2

Preparation of complexes of 2,5,8,11,14,17-hexaoxabicyclo[16.4.0]-docosane, (IV, Z=H)

(A) With ammonium thiocyanate.—1.481 gms. (0.047 mole) of 2,5,8,11,14,17-hexaoxabicyclo[16.4.0] docosane is mixed with 0.354 gm. (0.0047 mole) of ammonium thiocyanate in 15 ml. of methanol and allowed to evaporate at room temperature (26° C.). The compounds form a white solid complex melting in the range 124° C. to 147° C.

| | Percent | |
|---|---|---|
| | Found for product | Calculated for $C_{17}H_{34}N_2O_6S$ |
| C | 51.4 | 51.8 |
| H | 8.6 | 8.6 |
| N | 7.0 | 7.1 |
| S | 8.4 | 8.1 |

(B) With barium thiocyanate.—Using the same procedure as in Part A above 1.00 gm. (0.004 mole) of $Ba(SCN)_2$ is made into a complex by reaction with 1.261 gm. (0.004 mole) of the crown compound of Part A. The white solid complex melts at 282.5° C. leaving a solid residue.

| | Percent | |
|---|---|---|
| | Found for product | Calculated for $C_{18}H_{30}N_2O_6S_2Ba$ |
| C | 37.6 | 37.8 |
| H | 5.3 | 5.3 |
| N | 4.3 | 4.9 |

EXAMPLE 3

Formation of crowned complexes in solution

In each case a solid crystal of the inorganic salt was added to a very dilute solution of the macrocyclic compound in reagent grade methanol at room temperature in a silica glass spectrophotometric cell having a path length of 1 centimeter. The formation of complexes in solution is shown by the ultraviolet spectra which shows pronounced changes in absorption compared with spectra of the ring compounds alone. Complex formation is demonstrated in the following cases.

(A) 2,3,9,10 - dibenzo - 1,4,8,11 - tetraoxacyclotetradeca-2,9-diene, (V, Z=H), $2 \times 10^{-4}$ molar, with LiBr and NaBr.

(B) 2,3,9,10 - dibenzo - 1,4,8,11,14 - pentaoxacyclohexadeca-2,9-diene, (VII, Z=H), $2.24 \times 10^{-4}$ molar, with NaBr.

(C) 2,3,8,9-dibenzo-1,4,7,10,13,16-hexaoxacyclooctadeca-2,8-diene, (XIII, Z=H), $2.06 \times 10^{-4}$ molar, with NaBr, KBr, CsF, $SrCl_2$ and $BaCl_2$.

(D) 2,3,11,12-dibenzo-1,4,7,10,13,16-hexaoxyacyclooctadeca-2,11-diene, (XV, Z=H), $1.86 \times 10^{-4}$ molar, With $NH_4CNS$, LiBr, NaBr, KBr, CsF, $AgNO_3$, $CaCl_2$, $SrCl_2$, $BaCl_2$, $HgCl_2$, $La(CH_3COO)_3$, $CeF_3$.

(E) 2,3,14,15-dibenzo-1,4,7,10,13,16,19,22-octaoxacyclotetracosa-2,14-diene, (XXIV, Z=H), $2.1 \times 10^{-4}$ molar with $BaCl_2$.

(F) 2,3,9,10-bis(tert-butyl benzo)-1,4,8,11-tetraoxacyclotetradeca-2,9-diene, (V, Z=tert-butyl), $2.3 \times 10^{-4}$ molar, with LiBr and NaBr.

(G) 2,3,11,12-bis(tert-butyl benzo)-1,4,7,10,13,16-hexaoxacyclooctadeca-2,11-diene, (XV, Z=tert-butyl), $1.75 \times 10^{-4}$ molar with LiBr, NaBr, CsF, $CaCl_2$, $SrCl_2$, $BaCl_2$ KBr.

(H) 2,3-benzo-1,4,7,10,13,16-hexaoxacyclooctadeca-2-ene, (III, Z=H), $4.74 \times 10^{-4}$ molar, with NaBr, KBr, CsF, $CaCl_2$, $SrCl_2$ and $BaCl_2$.

(I) 2,3,8,9,14,15-tribenzo-1,4,7,10,13,16-hexaoxacyclo-octa-deca-2,8,14-triene, (XXXII, Z=H), $1.67 \times 10^{-4}$ molar, with NaBr, KBr, $CaCl_2$.

(J) 2,3,8,9,14,15-tribenzo-1,4,7,10,13,16-hexaoxacyclo-nona-deca-2,8,14-triene, (XXVIII, Z=H), $1.75 \times 10^{-4}$ molar, with KBr.

(K) 2,3,11,12-dibenzo-1,4,7,10,13,16,19-heptaoxacyclohheneicosa-2,11-diene, (XXX, Z=H), $1.78 \times 10^{-4}$ molar, with CsF and $BaCl_2$.

(L) 2,3,8,9,14,15,20,21-tetrabenzo-1,4,7,10,13,16,19,22-octaoxacyclotetracosa-2,8,14,20-tetraene (XXXIV, Z=H), $1.18 \times 10^{-4}$ molar, with CsF and $BaCl_2$.

EXAMPLE 4

Preparation of crystalline crowned complexes (A) With sodium thiocyanate.—A 250-ml. beaker is charged with 3.6 g. (0.01 gram-mole) of 2,3,11,12-dibenzo - 1,4,7,10,13-16-hexaoxacyclooctadeca-2,11-diene, (XV, Z=H), 1 g. (0.0123 gram-mole) of NaCNS, 50 ml. of n-butanol and 100 ml. of methanol. The contents are then warmed on a steam-bath and concentrated to 70 ml. The resulting clear solution is allowed to cool to room temperature, and the resulting crystals are filtered, washed with methanol and dried in a vacuum oven at 40° C. White crystals weighing 2.6 g. are obtained. Yield: 63%. Some more product is recovered from the filtrate by concentration: 1.4 g. Yield: 34%.

| | Percent | |
|---|---|---|
| | Found for product | Calculated for $C_{21}H_{24}NO_6SNA$ |
| C | 57.1 | 57.2 |
| H | 5.7 | 5.4 |
| N | 4.0 | 3.2 |
| S | 7.1 | 7.3 |

NOTE.—Melting points: 230–232° C. Ultraviolet spectrum: Methanol, 273 mu, $\epsilon$=5,500; 279 mu, $\epsilon$=4,800.

(B) With lead acetate trihydrate.—A 250-ml. beaker is charged with 2.5 g. (0.0069 gram-mole) of the crown compound of Part A, 2.65 g. (0.007 gram-mole) of lead acetate trihydrate and 100 ml. of n-butanol. The mixture is then warmed on the steam-bath for 30 minutes while being periodically stirred. The crystals which result when it is cooled to room temperature, are filtered, washed with n-butanol and dried in a vacuum oven at 40° C. Four and a half grams of white powder are obtained. Yield: 95%.

| | Percent | |
|---|---|---|
| | Found for product | Calculated for $C_{24}H_{30}O_{10}Pb$ |
| C | 42.3 | 42.0 |
| H | 4.4 | 4.4 |
| Pb | 28.9 | 30.2 |

NOTE.—Melting range: 167–198° C.

(C) With sodium nitrite. A 250 ml. beaker, charged with 4.33 grams (0.012 gram-mole) of the crown compound of Part A, 0.9 grams (0.013 gram-mole) of $NaNO_2$, and 100 ml. of n-butanol, is warmed on a steam bath until a clear solution results. On being cooled to room temperature, it deposits white crystals of 2,3,11,12-dibenzo - 1,4,7,10,13,16 - hexaoxacyclooctadeca - 2,11-diene; evaporation of the solvent from the yellow filtrate gives 1.73 grams of a very pale yellow crowned 1:1 molecular complex weighing 1.73 grams, melting 154–157° C., and analyzing as follows:

| | Percent | |
|---|---|---|
| | Found for product | Calculated for $C_{20}H_{24}O_6 \cdot NaNO_2$ |
| C | 55.9 | 55.5 |
| H | 5.6 | 5.7 |
| N | 3.3 | 3.2 |

(D) With potassium hydroxide.—A solution of 2.36 g. (0.005 gram-mole) of 2,3,11,12-bis(tert-butyl benzo)-1,4,7,10,13,16 - hexaoxacyclooctadeca-2,11-diene, (XV, Z=tert-butyl), in 100 ml. of methanol containing 0.56 g. (0.0086 gram-mole) of 86% KOH is evaporated to dryness with an efficient vacuum pump. When the residue obtained has been warmed with 170 ml. of dry benzene and filtered through coarse paper, the resulting solution is found to be 0.0193 normal in alkalinity (by titrating with standardized hydrochloric acid to phenolthalein endpoint). According to this, 66% of the crown compound has formed a complex with KOH.

Control experiments, with and without methanol, show that KOH is not soluble in benzene.

(E) With Potassium pivalate.—A complex of potassium pivalate and the crown compound of Part D is made by mixing the following compounds and concentrating the resulting clear solution to dryness while rotated under vacuum:

Crown compound: 4.72 grams (0.01 gram-mole)
KOH: 1.47 grams (0.0105 gram-mole)
Methanol: 100 milliliters.

The friable residue obtained is dissolved in 75 ml. benzene, passed through decolorizing charcoal, and concentrated to dryness while rotated under vacuum. The crowned complex is a friable white solid weighing 5 grams, melting at 82–92° C., and analyzing as follows:

|  | Found for product | Calculated for $C_{33}H_{49}O_8K$ |
|---|---|---|
| C, percent | 64.5, 64.5 | 64.7 |
| H, percent | 7.8, 8.0 | 8.0 |
| Molecular weight | 605 | 612 |

(F) With potassium premanganate.—A crown complex of potassium permanganate and the crown compound of Part D is made by mixing the following compounds and concentrating the resulting solution to dryness while rotated under vacuum (at 25° C.):

Crown compound: 1 gram (0.00212 gram-mole)
$KMNO_4$: 0.335 gram (0.00212 gram-mole)
Acetone: 100 millimeters.

The dark purple residue is mixed with 54 milliliters of benzene; brown solid $MnO_2$ is filtered off. The dark purple filtrate containing 1:1 molecular complex deposits the latter as a mauve powder when mixed with cyclohexane.
$KMnO_4$ is not soluble in benzene.

EXAMPLE 5

Varying proportions of polyether and salt are reacted in methanol at about 60° C., filtered hot and allowed to stand at room temperature. Crystals that form either on cooling or on the loss of some solvent (never approaching dryness) are recovered by filtration, washed with cold methanol, and dried in a vacuum oven at 40–60° C. The following results are obtained:

| Crystalline complex | Moles crown/mole salt | | M.P., °C. | Yield, percent | Analysis, percent | | | |
|---|---|---|---|---|---|---|---|---|
|  | Reactants | Complex |  |  | C | H | N | S |
| I, Z=H: |  |  |  |  |  |  |  |  |
| NaCNS | 1:1 | 1:1 | 162–165 | 50 | 51.5 | 5.7 | 4.1 | 9.5 |
| CsCNS | 2:0 | 2:1 | 127 |  | 48.0 | 5.3 | 2.3 | 4.8 |
| $AgNO_3$ | 2:1 | 1:1 | 134–135 | 59 | 38.3 | 4.4 | 3.2 | Ag=24.0 |
| XV, Z=H: |  |  |  |  |  |  |  |  |
| KCNS | 1:1 | 1:1 | 245–246 | 83 | 55.6 | 4.9 | 3.2 | 7.0 |
| KCNS | 2:1 | 1:1 | 246–247 | 33 | 55.6 | 5.2 | 3.0 | 6.6 |
| RbCNS | 1:1 | 1:1 | 184–185 | >37 | 50.1 | 4.6 | 3.2 | 6.4 |
| RbCNS | 2:1 | 2:1 | 175–176 | 21 | 56.5 | 5.4 | 1.7 | 3.9 |
| CsCNS | 2:1 | 2:1 | 146–147 | 58 | 53.2 | 5.3 | 1.7 | 3.9 |
| CsI | 2:1 | 2:1 | 115–116 | 53 | 48.2 | 5.0 |  | I=13.0 |
| XV, Z=t-butyl: CsCNS | 2:1 | 2:1 | 108–116 | >44 | 59.6 | 6.7 | 1.3 | 3.0 |
| XII, Z=H: CsCNS | 2:1 | 2:1 | (¹) | Ca. 20 | 54.1 | 5.1 | 1.6 | 3.2 |
| XXIV, Z=H: CsCNS | 2:1 | 1:1 | 88–89 | 30 | 52.1 | 5.8 | 1.6 | 3.5 |

¹ Soft at 40.

EXAMPLE 6

Preparation of triiodide complexes

The clear brown solution obtained by mixing 0.347 g. (0.00133 gram-mole) of cesium iodide, 1 g. (0.00269 gram-mole) of 2,5,8,15,18,21-hexaoxatricyclo[20.4.0.$0^{9.14}$]hexacosane, (XVI, Z=H), in 11 ml. of methanol with 0.349 g. (0.00133 gram-mole) of iodine dissolved in 14 ml. of methylene chloride, is evaporated to dryness under vacuum in a rotary evaporator. The brown solids are mixed thoroughly at room temperature with 25 ml. of toluene, separated by decantation and dried. The resulting viscous brown oil solidifies on standing at room temperature. Complexes of potassium triiodide and rubidium triiodide are similarly prepared, but the products do not liquify during the drying. The following results are obtained:

| Complex | Moles crown/mole salt | | M.P., °C. | Yield, percent | Analysis, percent | | |
|---|---|---|---|---|---|---|---|
|  | Reactants | Complex |  |  | C | H | I |
| XVI, Z=H: |  |  |  |  |  |  |  |
| $CsI_3$ | 2:1 | 3:2 | 112–114 | 54 | 33.5 | 4.9 | 34.8 |
|  |  |  |  |  | Cs=11.5 | | |
| $KI_3$ | 2:1 | 1:1 | 194–195 | 76 | 30.8 | 4.6 | 46.0 |
|  |  |  |  |  | K=5.4 | | |
| $RbI_3$ | 2:1 | 1:1 | 193–195 | 68 | 28.6 | 4.4 | 41.5 |
|  |  |  |  |  | Rb=11.0 | | |

What is claimed is:
1. A complex formed by mixing a polyether and an ionic compound wherein:
   (a) the polyether is characterized by a macrocyclic ring of carbon and oxygen atoms totaling 14–60 ring atoms, each oxygen being separated from its adjoining oxygens in the ring by 2 or 3 carbon atoms; and the macrocyclic ring being fused to 1–4 carbocyclic rings by vicinal atoms in the carbocyclic ring; said carbocyclic ring being from the group:
      (1) aromatic hydrocarbons of the benzo series of from 1–3 fused rings, or
      (2) perhydro analogues of (1); and
   (b) the cation of the ionic compound is from the group $Li^+$, $Na^+$, $K^+$, $Rb^+$, $Cs^+$, $Ca^{++}$, $Sr^{++}$, $Ba^{++}$, $NH^+$, $Cu^+$, $Ag^+$, $Hg^+$, $Hg^{++}$, $Tl^+$, $Pb^{++}$, $La^{+++}$, or $Ce^{+++}$.

2. A complex of claim 1 of a polyether and a cation wherein:
   (a) the polyether is characterized by a macrocyclic ring of carbon and oxygen atoms totaling 14–60 ring atoms, each oxygen being separated from its adjoining oxygens in the ring by 2 or 3 carbon atoms; and the macrocyclic ring being fused to 1–4 carbocyclic rings by vicinal atoms in the carbocyclic ring; said carbocyclic ring being from the group:
      (1) aromatic hydrocarbons of the benzo series of from 1–3 fused rings, or
      (3) perhydro analogues of (1); and
   (b) the cation is from the group $Li^+$, $Na^+$, $K^+$, $Rb^+$, $Cs^+$, $Ca^{++}$, $Sr^{++}$, $Ba^{++}$, $NH_4^+$, $Cu^+$, $Ag^+$, $Hg^+$, $Hg^{++}$, $Tl^+$, $Pb^{++}$, $La^{+++}$, or $Ce^{+++}$.

3. A complex of claim 1 wherein the anion of the ionic compound is from the group: thiocyanates, halides, trihalides, adipates, nitrates, nitrites, hydroxides, hydrosulfides, t-butoxides, acetates, phenyl salts, pivalates, permanganates, abietates, hexafluorophosphines, octanoates, heptylsulfonates, dicyanoaureates, hexacyanoferrites, cobalt (II) tetrachlorides, platinous tetrachlorides, and palladous (II) tetrachlorides.

4. The complex of claim 1 wherein the carbocyclic rings are phenylene or naphthalene rings or perhydro analogs thereof.

5. The complex of claim 4 wherein the macrocyclic polyether is one of the compounds designated by the formula

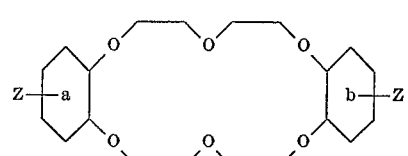

with Z being hydrogen or $(CH_3)_3C$-; $a$ and $b$ being benzo; cyclohexyl; 2,3-naphtho; 2,3-decalyl; $a$ being benzo and $b$ being cyclohexyl; or $a$ being 2,3-naphtho and $b$ being 2,3-decalyl;

and the cation of the ionic compound is an ion of an alkaline earth metal of atomic weight above 40 or an alkali metal ion.

6. The complex of claim 4 in which the carbocyclic rings are substituted with at least one halo, nitro, amino, $C_1-C_4$ alkyl, $C_2-C_4$ alkenyl, $C_6-C_{10}$ aryl, $C_7-C_{16}$ aralkyl, $C_1-C_4$ alkoxy, cyano, hydroxy, carboxy or sulfo.

7. The complex of claim 6 containing 1–2 fused carbocyclic rings.

8. The complex of claim 4 in which each oxygen in the macrocyclic ring is separated from its adjoining oxygens in the ring by two carbon atoms.

9. The complex of claim 4 in which each oxygen in the macrocyclic ring is separated from its adjoining oxygens in the ring by three carbon atoms.

10. The complex of claim 4 containing two fused carbocyclic rings, each of which is a $C_1-C_4$ alkyl substituted phenylene ring.

11. The complex of claim 4 containing two fused carbocyclic rings, each of which is a $C_1-C_4$ alkyl substituted cyclohexylene ring.

12. The complex of claim 4 wherein the macrocyclic polyether is:

(a) 2,3,11,12 - dibenzo - 1,4,7,10,13,16 - hexaoxacyclooctadeca-2,11-diene, or (b) 2,5,8,15,18,21 - hexaoxatricyclo [20.4.0.0$^{9,14}$] hexacosane and the cation of the ionic compound is an ion of an alkaline earth metal of atomic weight above 40 or an alkali metal ion.

13. The complex of claim 12 wherein the ionic compound is $KMnO_4$.

References Cited

UNITED STATES PATENTS

| 3,546,318 | 12/1970 | Vest | 260—340.3 X |
| 3,580,889 | 5/1971 | Barney | 260—340.3 X |

ALEX MAZEL, Primary Examiner

J. H. TURNIPSEED, Assistant Examiner

U.S. Cl. X.R.

260—41, 47, 79.5, 80.76, 80.77, 87.5, 87.7, 92.1, 146, 827